United States Patent
Arora et al.

(10) Patent No.: US 10,657,117 B2
(45) Date of Patent: May 19, 2020

(54) CRITICAL SITUATION CONTRIBUTION AND EFFECTIVENESS TRACKER

(71) Applicant: International Business Machines Corporation, Armonk, NY (US)

(72) Inventors: Pritpal S. Arora, Bangalore (IN); Bijo S. Kappen, Bangalore (IN); Gopal S. Pingali, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 15/092,036

(22) Filed: Apr. 6, 2016

(65) Prior Publication Data

US 2017/0075895 A1    Mar. 16, 2017

Related U.S. Application Data

(63) Continuation-in-part of application No. 14/851,566, filed on Sep. 11, 2015, now Pat. No. 10,521,770.

(51) Int. Cl.
*G06F 16/23* (2019.01)
*G06F 16/2457* (2019.01)

(52) U.S. Cl.
CPC ........ *G06F 16/23* (2019.01); *G06F 16/24578* (2019.01)

(58) Field of Classification Search
CPC .................... G06F 16/23; G06F 16/24578
See application file for complete search history.

(56) References Cited

U.S. PATENT DOCUMENTS

| | | |
|---|---|---|
| 5,386,515 A | 1/1995 | Martin et al. |
| 6,606,744 B1 | 8/2003 | Mikurak |
| 6,611,822 B1 | 8/2003 | Beams |
| 6,735,597 B1 | 5/2004 | Paradies |
| 7,007,235 B1 | 2/2006 | Hussein |
| 7,200,592 B2 | 4/2007 | Goodwin et al. |
| 7,298,867 B2 | 11/2007 | Slaski |
| 7,543,047 B2 | 6/2009 | Park et al. |
| 7,707,249 B2 | 4/2010 | Spataro et al. |
| 7,716,739 B1 | 5/2010 | McCorkendale |
| 7,917,815 B2 | 3/2011 | Rapp et al. |

(Continued)

FOREIGN PATENT DOCUMENTS

| | | |
|---|---|---|
| EP | 2498209 A1 | 2/2012 |
| WO | 2009076203 A1 | 6/2009 |

(Continued)

OTHER PUBLICATIONS

Mell et al., "The NIST Definition of Cloud Computing", NIST National Institute of Standards and Technology, US Department of Commerce, Special Publication 800-145, Sep. 2011, 7 pages.

(Continued)

*Primary Examiner* — Scott A. Waldron
(74) *Attorney, Agent, or Firm* — Edward J. Wixted, III (57) ABSTRACT

In an approach for dynamically ranking SMEs, based on the SMEs' activities during a critical situation, a processor identifies SMEs to work in a collaboration channel. A processor monitors an activity of the SME within the collaboration channel. A processor receives information from the monitored activity. A processor analyzes the information from the monitored activity. A processor updates a database that contains details about a plurality of SMEs.

16 Claims, 4 Drawing Sheets

(56) References Cited

U.S. PATENT DOCUMENTS

| | | | |
|---|---|---|---|
| 7,937,281 B2 | 5/2011 | Miller | |
| 8,200,527 B1 | 6/2012 | Thompson et al. | |
| 8,266,072 B2 | 9/2012 | Grace et al. | |
| 8,281,248 B2 | 10/2012 | Kürpick et al. | |
| 8,346,006 B1 | 1/2013 | Darbari et al. | |
| 8,352,870 B2 | 1/2013 | Bailor et al. | |
| 8,365,019 B2 | 1/2013 | Sailer et al. | |
| 8,473,432 B2 | 6/2013 | Anerousis et al. | |
| 8,572,022 B2 | 10/2013 | Hagan et al. | |
| 8,589,778 B2 | 11/2013 | Boyle et al. | |
| 8,635,283 B2 | 1/2014 | Vellanki et al. | |
| 8,639,650 B1 | 1/2014 | Gill | |
| 8,805,977 B2 | 8/2014 | Vemulapalli et al. | |
| 8,929,528 B2 | 1/2015 | Wallace et al. | |
| 9,425,966 B1 | 8/2016 | Potlapally et al. | |
| 2002/0194047 A1 | 12/2002 | Edinger et al. | |
| 2003/0004909 A1* | 1/2003 | Chauhan | G06N 5/022 706/45 |
| 2003/0046308 A1 | 3/2003 | Weber et al. | |
| 2004/0044542 A1* | 3/2004 | Beniaminy | G06N 5/022 706/45 |
| 2004/0243422 A1 | 12/2004 | Weber et al. | |
| 2005/0086248 A1 | 4/2005 | Atchison | |
| 2005/0289168 A1 | 12/2005 | Green et al. | |
| 2006/0211404 A1 | 9/2006 | Cromp et al. | |
| 2008/0022209 A1 | 1/2008 | Lyle | |
| 2008/0072158 A1 | 3/2008 | Samele et al. | |
| 2008/0114783 A1 | 5/2008 | Nguyen et al. | |
| 2008/0244418 A1 | 10/2008 | Manolescu | |
| 2008/0281915 A1 | 11/2008 | Elad | |
| 2008/0288914 A1 | 11/2008 | Schmitter | |
| 2009/0006161 A1 | 1/2009 | Chen et al. | |
| 2009/0063387 A1 | 3/2009 | Beaty et al. | |
| 2009/0083221 A1 | 3/2009 | Pingali et al. | |
| 2010/0050093 A1 | 2/2010 | Behrens et al. | |
| 2010/0057522 A1 | 3/2010 | Borowski et al. | |
| 2010/0070883 A1 | 3/2010 | Hamilton, II et al. | |
| 2010/0162131 A1 | 6/2010 | Gaillard et al. | |
| 2010/0250605 A1 | 9/2010 | Pamu et al. | |
| 2010/0262610 A1* | 10/2010 | Acosta | G06F 16/3334 707/748 |
| 2010/0318846 A1 | 12/2010 | Sailer et al. | |
| 2010/0325206 A1 | 12/2010 | Dayal et al. | |
| 2011/0055699 A1 | 3/2011 | Li | |
| 2011/0208822 A1 | 8/2011 | Rathod | |
| 2012/0226803 A1 | 9/2012 | Bharadwaj | |
| 2013/0132318 A1 | 5/2013 | Tanimoto et al. | |
| 2013/0151624 A1 | 6/2013 | Bhogal et al. | |
| 2013/0151948 A1 | 6/2013 | Khalil et al. | |
| 2013/0166550 A1 | 6/2013 | Buchmann et al. | |
| 2013/0197951 A1 | 8/2013 | Watson | |
| 2013/0198290 A1 | 8/2013 | Thomas | |
| 2013/0218783 A1 | 8/2013 | Anand | |
| 2014/0149436 A1 | 5/2014 | Bahrami et al. | |
| 2014/0164525 A1 | 6/2014 | Malik et al. | |
| 2014/0247460 A1 | 9/2014 | Gaertner et al. | |
| 2014/0279625 A1 | 9/2014 | Carter | |
| 2015/0032492 A1 | 1/2015 | Ting et al. | |
| 2015/0032751 A1* | 1/2015 | Ting | G06F 16/285 707/738 |
| 2015/0046643 A1 | 2/2015 | Whelan | |
| 2015/0179186 A1 | 6/2015 | Swierk et al. | |
| 2016/0055455 A1 | 2/2016 | Hill et al. | |
| 2016/0055553 A1 | 2/2016 | Hill et al. | |
| 2016/0072750 A1 | 3/2016 | Kass et al. | |
| 2016/0078012 A1 | 3/2016 | Dauw et al. | |
| 2016/0140186 A1 | 5/2016 | Langen | |

FOREIGN PATENT DOCUMENTS

| | | |
|---|---|---|
| WO | 2013016514 A1 | 1/2013 |
| WO | 2013026095 A1 | 2/2013 |

OTHER PUBLICATIONS

List of IBM Patents or Patent Applications Treated as Related, Dated Apr. 21, 2016, 2 pages.

U.S. Appl. No. 14/851,566, filed Sep. 11, 2015, Entitled "Dynamic Problem Statement with Conflict Resolution".

U.S. Appl. No. 14/948,670, filed Nov. 23, 2015, Entitled "Dynamic Problem Channel Constructor".

U.S. Appl. No. 14/948,670, filed Nov. 23, 2015, Entitled "Real-Time Tagger".

U.S. Appl. No. 15/091,882, filed Apr. 6, 2016, Entitled "Automatic Profile Generator and Scorer".

* cited by examiner

CRITICAL SITUATION CONTRIBUTION AND EFFECTIVENESS TRACKER

BACKGROUND OF THE INVENTION

The present invention relates generally to the field of incident management, and more particularly to dynamically ranking subject matter experts (SMEs), based on the SMEs' activities during a critical situation.

Incident management is a term describing the activities of an organization to identify, analyze, and correct hazards to prevent a future reoccurrence. An incident is an event that could lead to loss of, or disruption to, an organization's operations, services, or functions. If not managed, an incident can escalate into an emergency, a crisis, or a disaster. Incident management is, therefore, the process of limiting the potential disruption caused by such an event, followed by a return to business as usual. Without effective incident management, an incident can rapidly disrupt business operations, information security, IT systems, employees or customers, and other vital business functions.

SUMMARY

Aspects of an embodiment of the present invention disclose a method, computer program product, and computing system for dynamically ranking subject matter experts (SMEs), based on the SMEs' activities during a critical situation. A processor identifies SMEs to work in a collaboration channel. A processor monitors an activity of the SME within the collaboration channel. A processor receives information from the monitored activity. A processor analyzes the information from the monitored activity. A processor updates a database that contains details about a plurality of SMEs.

DETAILED DESCRIPTION

During an information technology (IT) incident or a critical situation involving any breakdown of an IT component involving a large scale outage, one of the preliminary steps to be performed is the problem definition (i.e., to define the problem and its associated sub-problems that need to be resolved in order to restore the IT incident or normalcy of operations).

Embodiments of the present invention recognize the recovery of the incident to restore the operations depends on the SMEs engaged in the critical situation and the specialized knowledge that the SMEs possess. Additionally, embodiments of the present invention recognize the need to have effective SMEs who can work at an efficient pace and quickly restore business operations. Embodiments of the present invention recognize the need to measure the effectiveness of relevant SMEs involved in a critical situation. Such a measurement could help SMEs and the management to take suitable actions in terms of identifying, rewarding, and training SMEs for effective and rapid critical situation resolution. Due to the current state of incident management, embodiments of the present invention recognize the need to dynamically rank SMEs, based on the SMEs' activities during a critical situation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
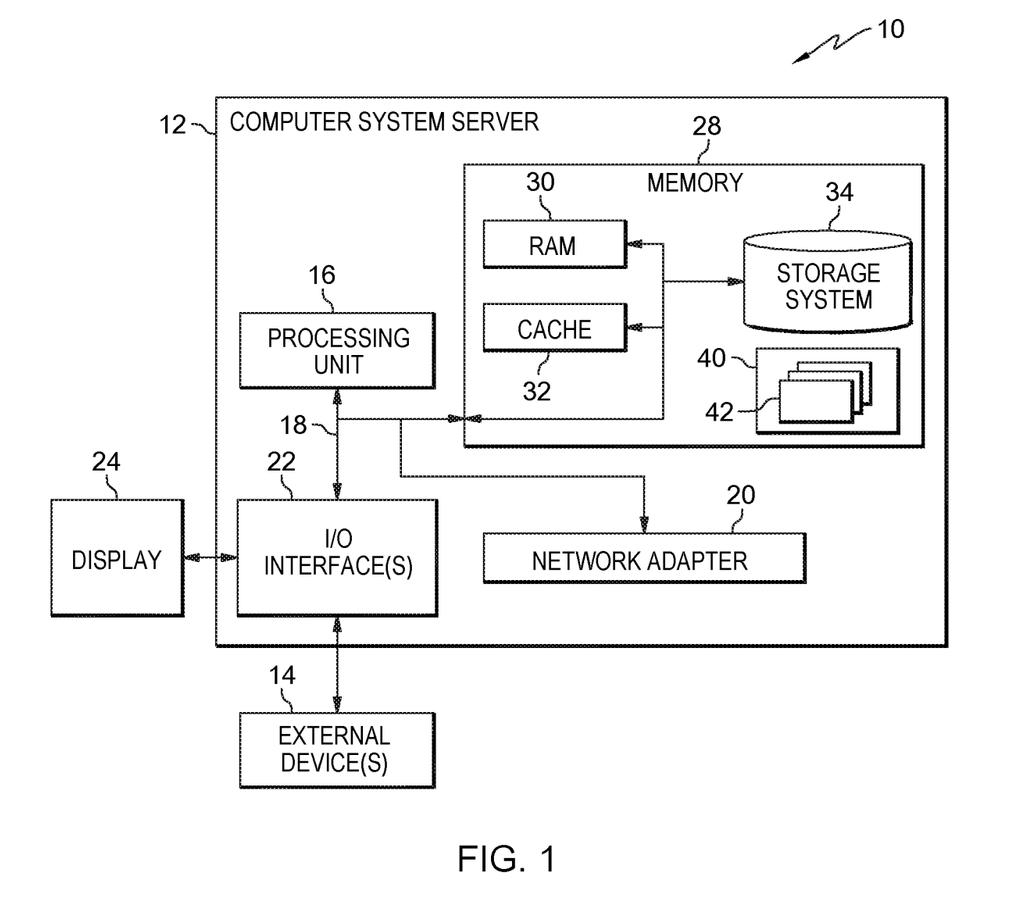
FIG. 1 depicts a block diagram according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
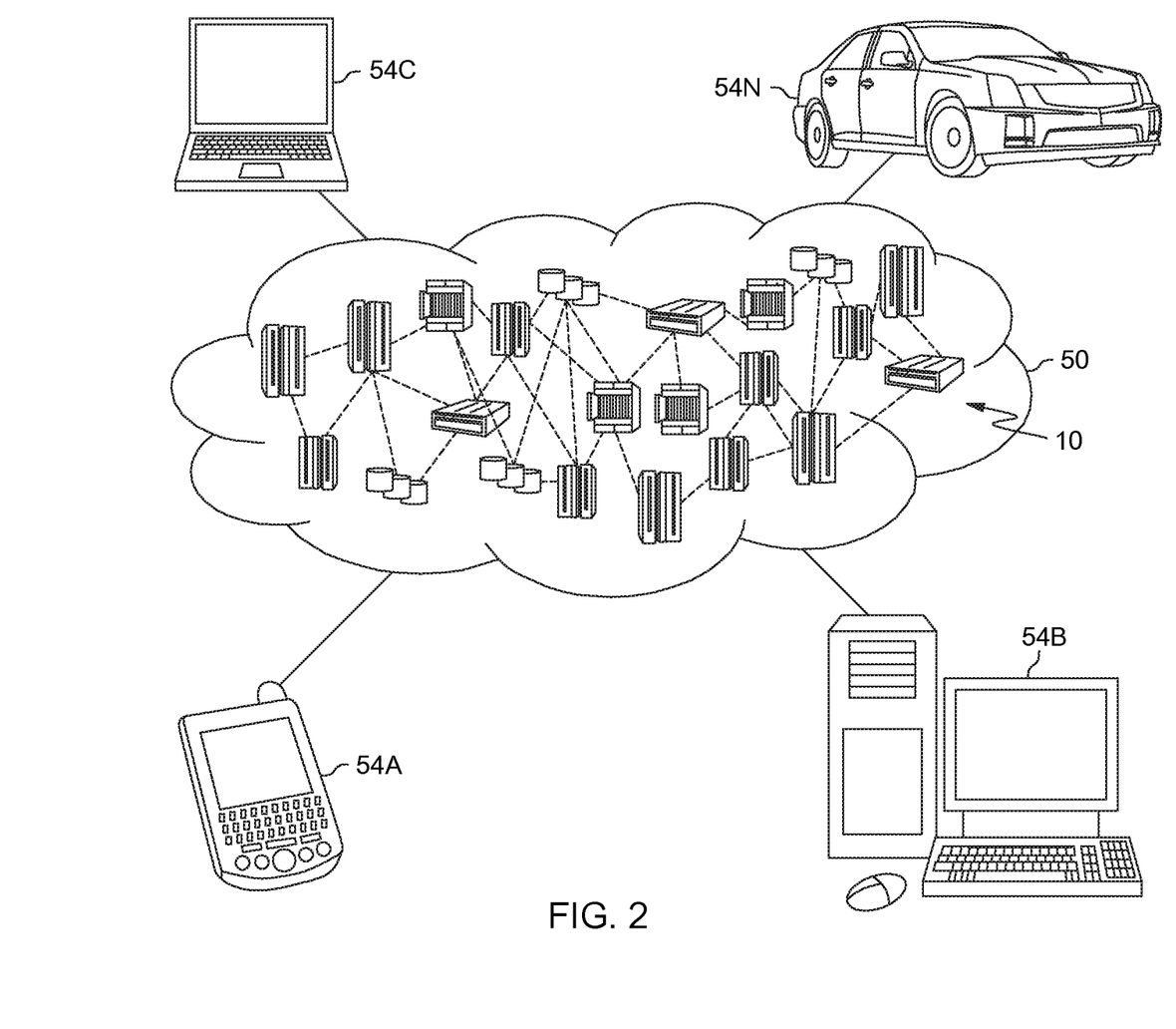
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
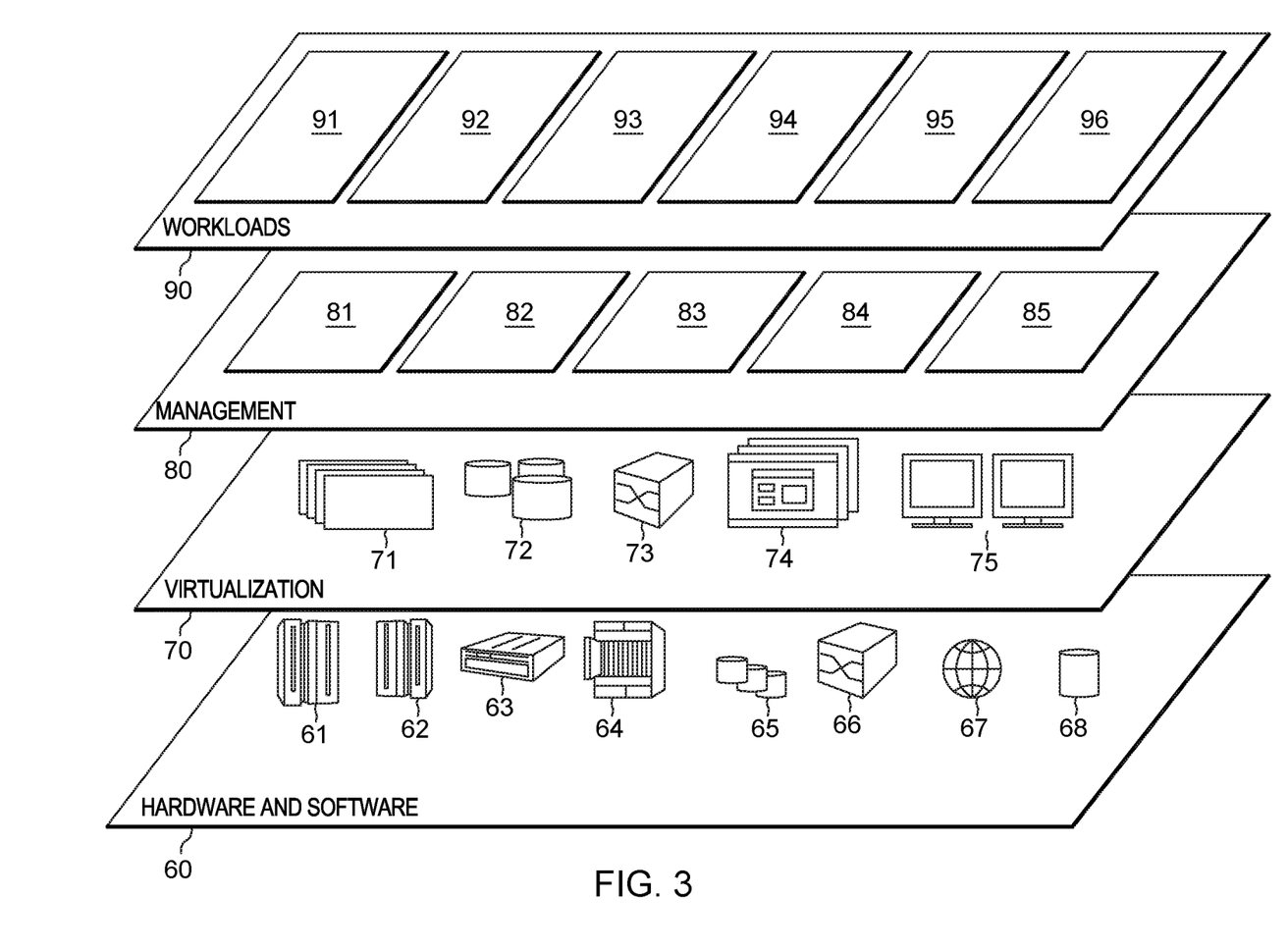
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ranking program 96.

Figure 4:
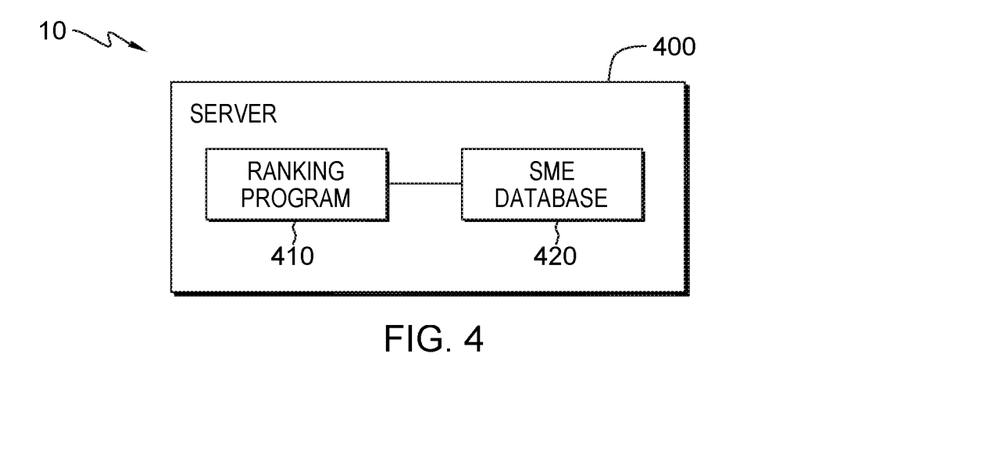
FIG. 4 depicts a block diagram of a computing system according to an embodiment of the present invention.

Referring now to FIG. 4, a diagram of a server 400 in cloud computing node 10 is shown, in accordance with one embodiment of the present invention. FIG. 4 provides an illustration of one embodiment and does not imply any limitations with regard to the environments in which different embodiments can be implemented.

In the depicted embodiment, server 400 contains ranking program 410 and SME database 420. Server 400 can include components as depicted and described in further detail with respect to FIG. 1.

Working within workloads layer 90 in FIG. 3, ranking program 410 operates to dynamically rank SMEs, based on the SMEs' activities during a critical situation. In doing so, ranking program 410 identifies SMEs. Ranking program 410 monitors the activities of the SMEs. Ranking program 410 receives information from the monitored activities. Ranking program 410 analyzes the information. Ranking program 410 updates the SME database. In the depicted embodiment, ranking program 410 resides on server 400. In other embodiments, ranking program 410, or similar programs, can reside on another server or another computing device, provided that ranking program 410 has access to SME database 420.

SME database 420 can be a repository that can be written to or read by ranking program 410. In one embodiment, a program (not shown) can allow a user to define various SMEs with their respective skills and availabilities and store the information to SME database 420. In the depicted embodiment, SME database 420 resides on server 400. In other embodiments, SME database 420, or similar databases, can reside on another server or another computing device, provided that SME database 420 is accessible to ranking program 410.

Figure 5:
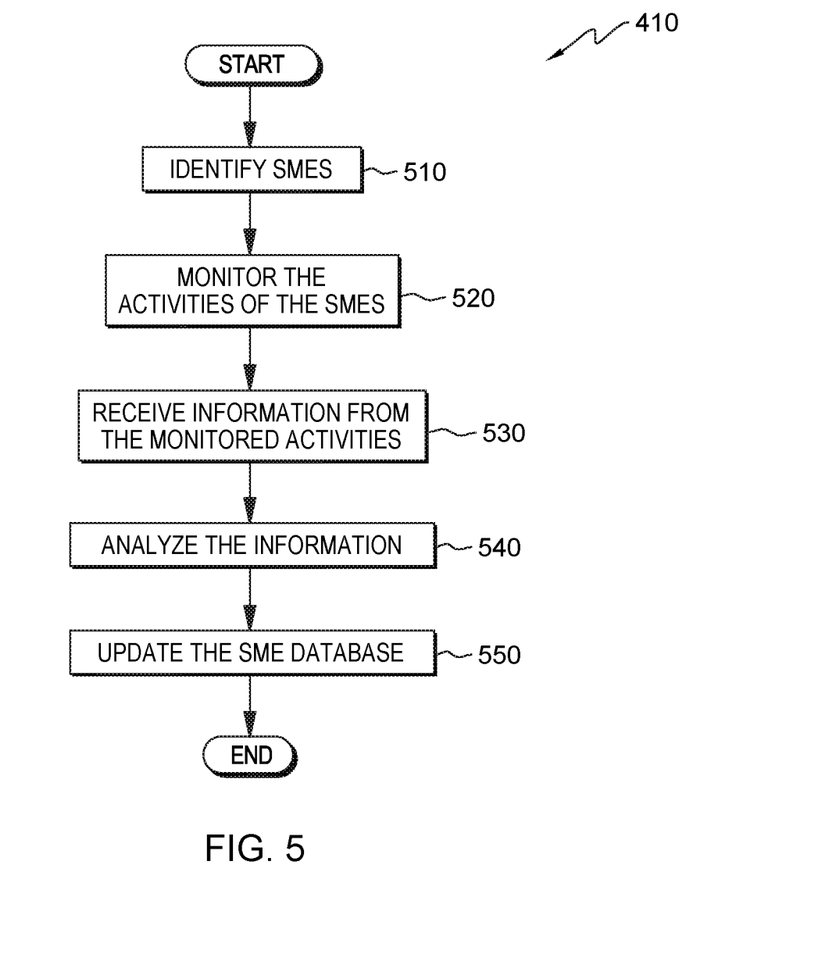
FIG. 5 depicts a flowchart of the steps of a ranking program, executing within the computing system of FIG. 4, for dynamically ranking SMEs, based on the SMEs' activities during a critical situation.

Referring now to FIG. 5, a flowchart of the steps of a ranking program is shown, executing within the computing system of FIG. 4, in accordance with an embodiment of the present invention. Ranking program 410 operates to dynamically rank SMEs, based on the SMEs' activities during a critical situation.

In step 510, ranking program 410 identifies SMEs. In one embodiment, ranking program 410 identifies SMEs from SME database 420. In doing so, ranking program 410 retrieves SME information from SME database, such as, but not limited to: names, schedules, type of expertise, etc. In other embodiments, ranking program 410 identifies SMEs by monitoring various, relevant collaboration channels that contain SMEs who are working to solve a similar problem. Collaboration channels can include, for example, a conference calling bridge, a chat session, a wiki page, and an incident management system. In some embodiments, ranking program 410 identifies SMEs by retrieving information from other programs (not shown) that operate to correlate SMEs with the SMEs', respective, expertise, schedule, other skills, etc.

In step 520, ranking program 410 monitors the activities of the SMEs. In one embodiment, ranking program 410 monitors the activities of the SMEs in terms of the SMEs' participation in various collaboration channels, the number of suggestions the SMEs are making in reference to solving the problem, how many suggestions turn into actions, feedback from the lead person for the critical situation resolution, how fast the SMEs resolved the outage, etc. In other embodiments, ranking program 410 monitors the activities of the SMEs during the entire time period of a critical situation. In some embodiments, ranking program 410 monitors the activities of the SMEs during a predetermined time period of a critical situation (e.g., from the beginning of a problem being detected until one hour after the detection of the problem).

In step 530, ranking program 410 receives information from the monitored activities. The information may include, but is not limited to: the SMEs' participation in various collaboration channels, the number of suggestions the SMEs are making in reference to solving the problem, how many suggestions turn into actions, feedback from the lead person for the critical situation resolution, how fast the SMEs resolved the outage, etc. In one embodiment, ranking program 410 receives information from the monitored activities, automatically, as information becomes available. In other embodiments, ranking program 410 receives information from the monitored activities, automatically, after a critical situation is resolved. In some embodiments, ranking program 410 receives information from the monitored activities after a predetermined time period (e.g., three hours after the detection of a problem).

In step 540, ranking program 410 analyzes the information. In one embodiment, ranking program 410 analyzes the information by assigning points to the SMEs, based on the information received from the monitored activities. In other embodiments, ranking program 410 analyzes the information by computing the effectiveness of each SME, based on a weighted score that uses the following factors: time spent, contributions to resolutions, number of engagement channels, number of converted actions, positive feedback received, social network influence, speed of resolutions, etc. In some embodiments, ranking program 410 analyzes the information by searching SME database 420 for similar SMEs to the SMEs currently being analyzed, based on the skills associated with the SMEs in SME database 420 and the skills, found from the analysis, of the current SMEs. Still, in other embodiments, ranking program 410 analyzes the information by automatically identifying a substitute SME when performance of the SME in a critical situation falls below a predetermined threshold within a predetermined time interval, based on a ranking of the plurality of SMEs, wherein the ranking is based on a relevance of the SME to the critical situation. Still, in some embodiments, ranking program 410 analyzes the information by performing a sentiment analysis, based on feedback of SMEs working within the collaboration channel. Sentiment analysis, sometimes known as opinion mining, refers to the use of natural language processing, text analysis, and computational linguistics to identify and extract subjective information in source materials.

In step 550, ranking program 410 updates the SME database. In one embodiment, ranking program 410 updates SME database 420, automatically, after a critical situation is resolved. In other embodiments, ranking program 410 updates SME database 420 after a predetermined number of critical situations have been resolved (e.g., after five critical situations). In some embodiments, ranking program 410 updates SME database 420 after a predetermined time period (e.g., after every seven days).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically ranking subject matter experts (SMEs), the method comprising:
    identifying, by one or more processors, a plurality of SMEs to work within a collaboration channel based on SME information stored in a SME database, wherein the collaboration channel is associated with an initial problem statement of a critical situation that includes an information technology (IT) component;
    monitoring, by the one or more processors, activity of the plurality of SMEs within the collaboration channel, wherein the information includes: a number of suggestions the plurality of SMEs make, a number of the suggestions that turn into actions, feedback from a critical situation lead who oversees the collaboration channel, and speed the plurality of SMEs resolve the critical situation;
    receiving, by the one or more processors, information from the monitored activity;
    analyzing, by the one or more processors, the information from the monitored activity, wherein the analyzing includes calculating a weighted effectiveness score of each of the plurality of SMEs on the critical situation, based on the plurality of SMEs respective: number of suggestions made, number of suggestions that turned into actions, positive feedback received, and speed of resolving the critical situation; and
    updating, by the one or more processors, the SME information stored in the SME database with the analyzed information.

2. The method of claim 1, wherein the activity includes the plurality of SMEs' participation within the collaboration channel.

3. The method of claim 1, wherein analyzing the information from the monitored activity further comprises:
    performing a sentiment analysis based on feedback of the plurality of SMEs working within the collaboration channel, wherein the sentiment analysis is a use of natural language processing, text analysis, and computational linguistics to identify and extract subjective information in source materials.

4. The method of claim 1, wherein analyzing the information from the monitored activity further comprises:
    assigning points to the plurality of SMEs based on the information received from the monitored activity.

5. The method of claim 1, wherein analyzing the information from the monitored activity further comprises:
    identifying, automatically, a substitute SME when performance of an SME of the plurality of SMEs in the critical situation falls below a predetermined threshold, within a predetermined time interval, based on a ranking of the plurality of SMEs, wherein:
the ranking is based on a relevance of the plurality of SMEs to the critical situation and the activity during the critical situation.

6. The method of claim 1, wherein the collaboration channel is selected from the group consisting of: a conference calling bridge, a chat session, a wiki page, and an incident management system.

7. A computer program product for dynamically ranking SMEs, the computer program product comprising:
one or more computer readable storage media and program instructions collectively stored on the one or more computer readable storage media, the program instructions comprising:
program instructions to identify a plurality of SMEs to work within a collaboration channel based on SME information stored in a SME database, wherein the collaboration channel is associated with an initial problem statement of a critical situation that includes an information technology (IT) component;
program instructions to monitor activity of the plurality of SMEs within the collaboration channel, wherein the information includes: a number of suggestions the plurality of SMEs make, a number of the suggestions that turn into actions, feedback from a critical situation lead who oversees the collaboration channel, and speed the plurality of SMEs resolve the critical situation;
program instructions to receive information from the monitored activity;
program instructions to analyze the information from the monitored activity, wherein the analyzing includes calculating a weighted effectiveness score of each of the plurality of SMEs on the critical situation, based on the plurality of SMEs respective: number of suggestions made, number of suggestions that turned into actions, positive feedback received, and speed of resolving the critical situation; and
program instructions to update the SME information stored in the SME database with the analyzed information.

8. The computer program product of claim 7, wherein the activity includes the plurality of SMEs' participation within the collaboration channel.

9. The computer program product of claim 7, wherein program instructions to analyze the information from the monitored activity further comprise:
program instructions to perform a sentiment analysis based on feedback of the plurality of SMEs working within the collaboration channel, wherein the sentiment analysis is a use of natural language processing, text analysis, and computational linguistics to identify and extract subjective information in source materials.

10. The computer program product of claim 7, wherein program instructions to analyze the information from the monitored activity further comprise:
program instructions to assign points to the plurality of SMEs based on the information received from the monitored activity.

11. The computer program product of claim 7, further comprising:
program instructions, stored on the one or more computer readable storage media, to identify, automatically, a substitute SME when performance of an SME of the plurality of SMEs in the critical situation falls below a predetermined threshold, within a predetermined time interval, based on a ranking of the plurality of SMEs, wherein:
the ranking is based on a relevance of the SMEs to the critical situation and the activity during the critical situation.

12. A computer system for dynamically ranking SMEs, the computer system comprising:
one or more computer processors, one or more computer readable storage media, and program instructions stored on the computer readable storage media for execution by at least one of the one or more processors, the program instructions comprising:
program instructions to identify a plurality of SMEs to work within a collaboration channel based on SME information stored in a SME database, wherein the collaboration channel is associated with an initial problem statement of a critical situation that includes an information technology (IT) component;
program instructions to monitor activity of the plurality of SMEs within the collaboration channel, wherein the information includes: a number of suggestions the plurality of SMEs make, a number of the suggestions that turn into actions, feedback from a critical situation lead who oversees the collaboration channel, and speed the plurality of SMEs resolve the critical situation;
program instructions to receive information from the monitored activity;
program instructions to analyze the information from the monitored activity, wherein the analyzing includes calculating a weighted effectiveness score of each of the plurality of SMEs on the critical situation, based on the plurality of SMEs respective: number of suggestions made, number of suggestions that turned into actions, positive feedback received, and speed of resolving the critical situation; and
program instructions to update the SME information stored in the SME database with the analyzed information.

13. The computer system of claim 12, wherein the activity includes the plurality of SMEs' participation within the collaboration channel.

14. The computer system of claim 12, wherein program instructions to analyze the information from the monitored activity further comprise:
program instructions to perform a sentiment analysis based on feedback of the plurality of SMEs working within the collaboration channel, wherein the sentiment analysis is a use of natural language processing, text analysis, and computational linguistics to identify and extract subjective information in source materials.

15. The computer system of claim 12, wherein program instructions to analyze the information from the monitored activity further comprise:
program instructions to assign points to the plurality of SMEs based on the information received from the monitored activity.

16. The computer system of claim 12, further comprising:
program instructions, stored on the one or more computer readable storage media, to identify, automatically, a substitute SME when performance of an SME of the plurality of SMEs in the critical situation falls below a predetermined threshold, within a predetermined time interval, based on a ranking of the plurality of SMEs, wherein:

the ranking is based on a relevance of the SMEs to the critical situation and the activity during the critical situation.

* * * * *